(12) United States Patent
Woerner (10) Patent No.: US 11,399,474 B2
(45) Date of Patent: Aug. 2, 2022

(54) INTEGRATED FENCE IRRIGATION AND GROW SYSTEM

(71) Applicant: John Anthony Woerner, Cape May, NJ (US)

(72) Inventor: John Anthony Woerner, Cape May, NJ (US)

( * ) Notice: Subject to any disclaimer, the term of this patent is extended or adjusted under 35 U.S.C. 154(b) by 835 days.

(21) Appl. No.: 16/280,578

(22) Filed: Feb. 20, 2019

(65) Prior Publication Data

US 2019/0254241 A1    Aug. 22, 2019

Related U.S. Application Data

(60) Provisional application No. 62/632,782, filed on Feb. 20, 2018.

(51) Int. Cl.
| | |
|---|---|
| *A01G 25/02* | (2006.01) |
| *E04H 17/14* | (2006.01) |
| *E04H 17/16* | (2006.01) |
| *A01G 31/06* | (2006.01) |
| *A01G 9/02* | (2018.01) |

(52) U.S. Cl.
CPC ............. *A01G 25/02* (2013.01); *A01G 9/022* (2013.01); *A01G 31/06* (2013.01); *E04H 17/1413* (2013.01); *E04H 17/163* (2013.01); *E04H 17/146* (2021.01)

(58) Field of Classification Search
CPC ......... A01G 31/06; A01G 9/025; A01G 25/02
See application file for complete search history.

(56) References Cited

U.S. PATENT DOCUMENTS

| | | | | |
|---|---|---|---|---|
| 4,255,896 | A * | 3/1981 | Carl ....................... | A01G 31/06 47/79 |
| 4,858,636 | A * | 8/1989 | Adkins ................ | A01G 25/023 251/117 |
| 5,067,275 | A * | 11/1991 | Constance ............. | A01G 31/02 47/59 R |
| 7,536,827 | B2 * | 5/2009 | Busch .................... | C12M 23/18 209/4 |
| 9,545,059 | B2 * | 1/2017 | DeMerchant, Jr. ...... | A01G 9/14 |

(Continued)

FOREIGN PATENT DOCUMENTS

| | | | |
|---|---|---|---|
| CN | 202132835 U | * | 2/2012 |
| JP | 2012249575 A | * | 12/2012 |
| KR | 20110045740 A | * | 5/2011 |

*Primary Examiner* — Joshua D Huson
*Assistant Examiner* — Katherine Anne Kloecker
(74) *Attorney, Agent, or Firm* — MKG, LLC (57) ABSTRACT

An integrated fence irrigation and grow system is provided. The system includes one or more post members, one or more bed members disposed on the post members and an irrigation system coupled to a water supply and connected to each of the bed members to introduce water to each of the bed members. The bed members each include a tubular body having a top surface and a bottom surface. The tubular body is formed by a wall, and the wall defines an interior cavity in the bed member. The wall includes a plurality of openings disposed along a top surface of the bed members. When growing medium is disposed within the interior cavity of the bed members, plants planted in the growth medium in proximity to the openings grow therein, and foliage thereof is at least one of viewable and harvestable above the plurality of openings.

17 Claims, 5 Drawing Sheets

(56) References Cited

U.S. PATENT DOCUMENTS

2012/0247012 A1* 10/2012 Johnson ............. A01G 13/0225
  47/32.4
2017/0238474 A1* 8/2017 Fakhari ................... A01G 9/12
2019/0216028 A1* 7/2019 Ho ......................... A01G 24/40

* cited by examiner

INTEGRATED FENCE IRRIGATION AND GROW SYSTEM

CROSS-REFERENCE TO RELATED APPLICATIONS

This patent application claims priority benefit under 35 U.S.C. § 119(e) of U.S. Provisional Patent Application, Ser. No. 62/632,782, filed on Feb. 20, 2018. The disclosure of this patent document is incorporated herein by reference in its entirety.

COPYRIGHT NOTICE

A portion of the disclosure of this patent document may contain material, which is subject to copyright protection. The copyright owner has no objection to the facsimile reproduction by anyone of the patent document or the patent disclosure, as it appears in the U.S. Patent and Trademark Office files or records, but otherwise reserves all copyright rights whatsoever.

BACKGROUND OF THE INVENTION

1. Field of the Invention

The present invention relates generally to an integrated fence irrigation and grow system that increases arability and above-ground cultivation of decorative and edible flora while also providing a border or boundary along a location of interest.

2. Description of Related Art

Generally speaking, various types of integrated irrigation and grow systems are known in the prior art. However, there is still a need for an integrated fence irrigation and grow system that includes one or more bed members disposed securable on either side of one or more post members. An irrigation system enables controlled outflow for adjustable drip irrigation interior to each of the one or more bed members, whereby arability is increasable and above-ground cultivation is effective along decorative and edible borders, boundaries, fence lines, rooftops, among other desired locations, in urban and suburban landscapes.

SUMMARY OF THE INVENTION

The present invention is directed to an integrated fence irrigation and grow system devised to enable increased arability in growth media, e.g., soil, supportable above-ground whereby a decorative barrier or boundary is selectively positional, as desired, and ornamental and edible flora is producible therein accessible for viewing and harvest, as desired. The present integrated fence irrigation and grow system is contemplated for use in urban areas, suburban areas, along property boundaries, rooftops, and elsewhere, as case may be wherever additional growing space is desirable, although additional sites and locations are contemplated inclusive with the present invention.

In one embodiment, the integrated fence irrigation and grow system, therefore, includes one or more bed members disposed, for example, in parallel relation along opposing sides of each of one or more post members. In one embodiment, the system includes a pair of topmost bed members, a pair of middle bed members, and a pair of lowermost bed members situated on either side of the one or more post members in paired relation.

In one aspect of the invention, each of the bed members includes a tubular body having a plurality of openings disposed along a top surface thereof. Each of the plurality of openings is appropriate for exposure of foliage of flora planted in growing medium, e.g., soil, storable interior to each of the bed members. Plants grown to sprout within each of the plurality of openings, therefore, are accessible along each top surface of each of the bed members.

In one embodiment, each of the bed members is connected at a first end with an irrigation system. The irrigation system is connectable to a water supply such as, for example, a hose pipe, whereby water is introducible for infiltration along each of the bed members. Each of the bed members includes a pipe disposed therein along the length of the bed member. Each pipe is disposed connected endwise to the irrigation system whereby water is deliverable through the irrigation system to outflow through each of a plurality of perforations disposed serried along each pipe. Thus, drip irrigation is enabled for infiltration interior to each bed member.

In still another embodiment, the irrigation system includes a plurality of valves disposed associated with each of the one or more bed members. Rate of water flow to each bed member is thereby controllable individually by manipulation of each associated valve. Thus, irrigation for particular flora grown interior to each bed member is selectively controllable, as desired, appropriate therefore.

In yet another embodiment of the integrated fence irrigation and grow system, each of the one or more post members is disposed vertically securable into a ground surface. In one embodiment, the post members are disposed in spaced relation along a common sagittal plane thereupon. Each of the one or more post members includes a first side and a second side whereon a plurality of support members is perpendicularly disposed for supportive engagement upholding each of the one or more bed members.

In yet another embodiment, a trellis member is disposed between each of the one or more post members, and presents an ornamental boundary therebetween. Each trellis member further provides a support medium for climbing plants that may be grown in the present integrated fence irrigation and grow system, as desired.

In still another embodiment, each of the one or more post members includes a capital member disposed thereon. A solar panel is disposed upon each capital member, whereby solar insolation incident each of the solar panel generates a potential difference storable as electrical energy appropriate for powering a light source, disposed proximal to an eave disposed upon each capital member, whereby each post member is illuminable during dark hours, as desired.

The present integrated fence irrigation and grow system, therefore, provides a structural medium for above-ground growth of desired flora enabling a decorative accent, boundary, or fence dispositional upon property, as desired, whereby increased arability is enjoyable in urban, suburban, and other landscapes and controllable irrigation is effective to maximize growth and any associated yield, as desired.

Thus has been broadly outlined some aspects and features of the present integrated fence irrigation and grow system so that the detailed description thereof that follows may be better understood and in order that the present contribution to the art may be better appreciated.

For better understanding of the integrated fence irrigation and grow system, its operating advantages and specific objects attained by its uses, refer to the accompanying drawings and description.

BRIEF DESCRIPTION OF THE DRAWINGS

The features and advantages of the present invention will be better understood when the Detailed Description of the Preferred Embodiments given below is considered in conjunction with the figures provided.

In these figures like structures are assigned like reference numerals, but may not be referenced in the description of all figures.

DETAILED DESCRIPTION OF PREFERRED EMBODIMENTS

With reference now to the drawings, and in particular FIGS. 1 through 5 thereof, an example of the instant integrated fence irrigation and grow system, employing the principles and concepts of the present integrated fence irrigation and grow system and generally designated by the reference number 10, will be described.

Referring to FIGS. 1 through 5, one embodiment of the integrated fence irrigation and grow system 10 is illustrated. The integrated fence irrigation and grow system 10 has been devised to provide a decorative barrier or boundary while providing growing space for ornamental and edible flora or plants 12, as desired. The present integrated fence irrigation and grow system 10, therefore, includes one or more bed members 20 disposed in one or more parallel planes along one or more post members 22. In one embodiment, as illustrated in FIGS. 1 to 4, the bed members 20 are horizontally disposed in three vertical parallel planes between and on opposing sides of one or more post members 22, e.g., three post members 22. It should be appreciated however, that the present invention is not limited to this illustrated embodiment, and that it is within the scope of the present invention to provide multiple configurations of bed members 20 and post members 22 as described herein to achieve the aforementioned decorative barrier or boundary.

Each of the one or more bed members 20 includes a tubular body formed by a wall 21 having a consistent thickness to provide rigidity and strength without excess weight, and defining an interior cavity 23 therein. The wall 21 includes a plurality of openings 24 therethrough, and disposed on a top surface 26 of the bed members 20. Each of the plurality of openings 24 are disposed for exposure of plants 12 grown in the interior cavity 23 of each of the bed members 20 in a growth medium 14 such as, for example soil, disposed therein, wherein the plants' foliage is accessible and harvestable above each of the bed members 20. In one embodiment, the bed members 20 include integrally formed, or selectively disposed, in the interior cavity 23, a plurality of plant containers 16 or other means for retaining the growth medium (e.g., soil) 14 and the plants 12 therein and located proximal to a corresponding one of the plurality of openings 24. In one embodiment, a plurality of drainage holes 25 are disposed through the wall 21 along a bottom surface 27 of each of the one or more bed members 20 to allow passage of excess water out of the interior cavity 23.

In one embodiment, each bed member 20 is connected at a first end 28 to an irrigation system 30. The irrigation system 30 is connectable at a lowermost section to a water source such as, for example, a garden hose 70 or other conduit, such that water is introducible into each of the one or more bed members 20 and distributable along a length of each of the bed members 20 along a pipe 32 disposed in the bed member 20. In one embodiment, the pipe 32 is held in the interior cavity 23 within the bed member 20 above the growth medium 14 by a plurality of clips 31. Water is thus introducible by the irrigation system 30 to hydrate the growth medium 14 disposed in the interior cavity 23 of each of the bed members 20 whereby automated watering of plants 12 grown therein is effective.

In one embodiment, the irrigation system 30 includes a plurality of valves 34 disposed in between each of the one or more bed members 20. Each of the plurality of valves 34 is adjustable to regulate flow of water therethrough, whereby rate of watering is selectively controllable for each of the one or more bed members 20, as desired. It is contemplated that in one embodiment each pipe 32 includes a plurality of perforations therein, each perforation enabling drip irrigation therefrom, whereby rate of each drip producible from each perforation is controllable by manipulation of an associated one of the plurality of valves 34.

Figure 1:
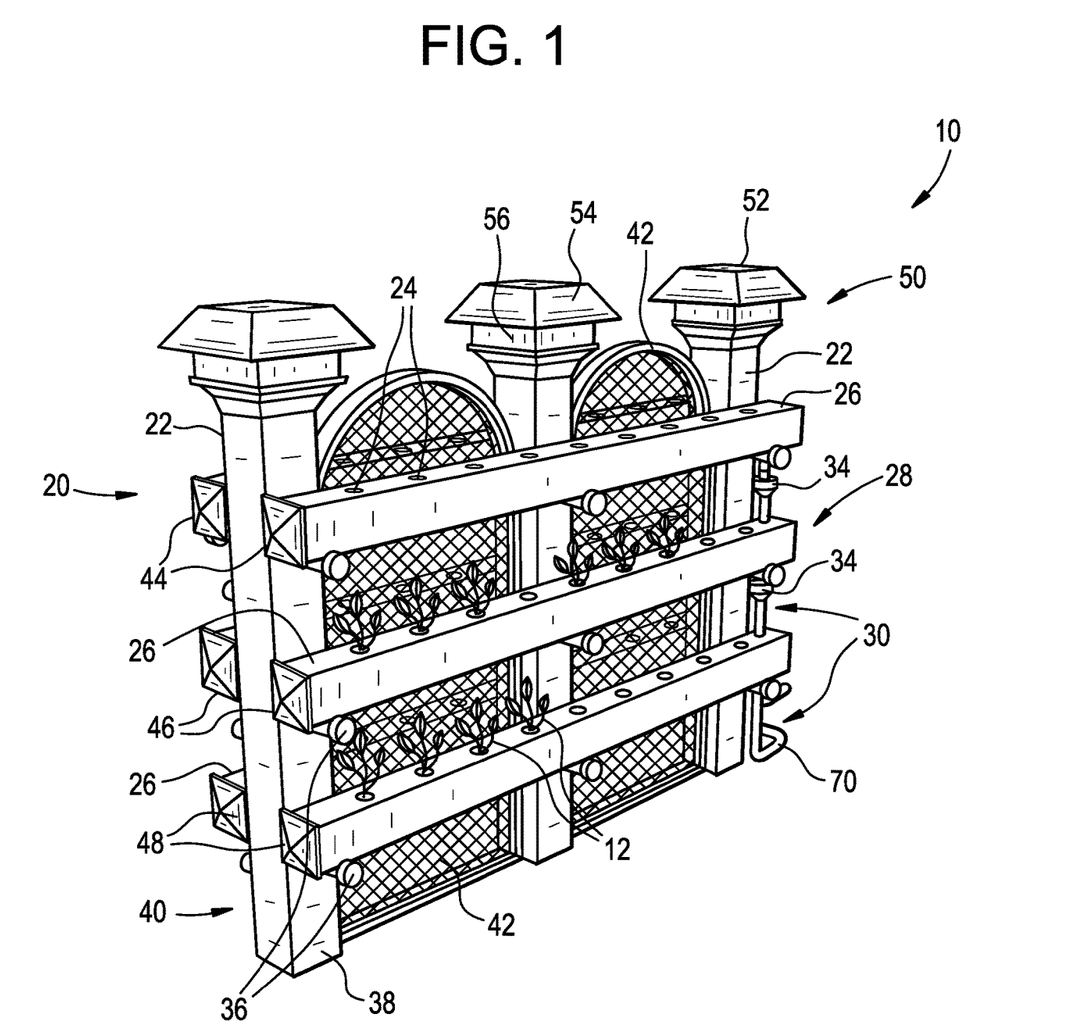
FIG. 1 depicts an isometric view of an integrated fence irrigation and grow system, in accordance with one embodiment of the present invention.
Figure 2:
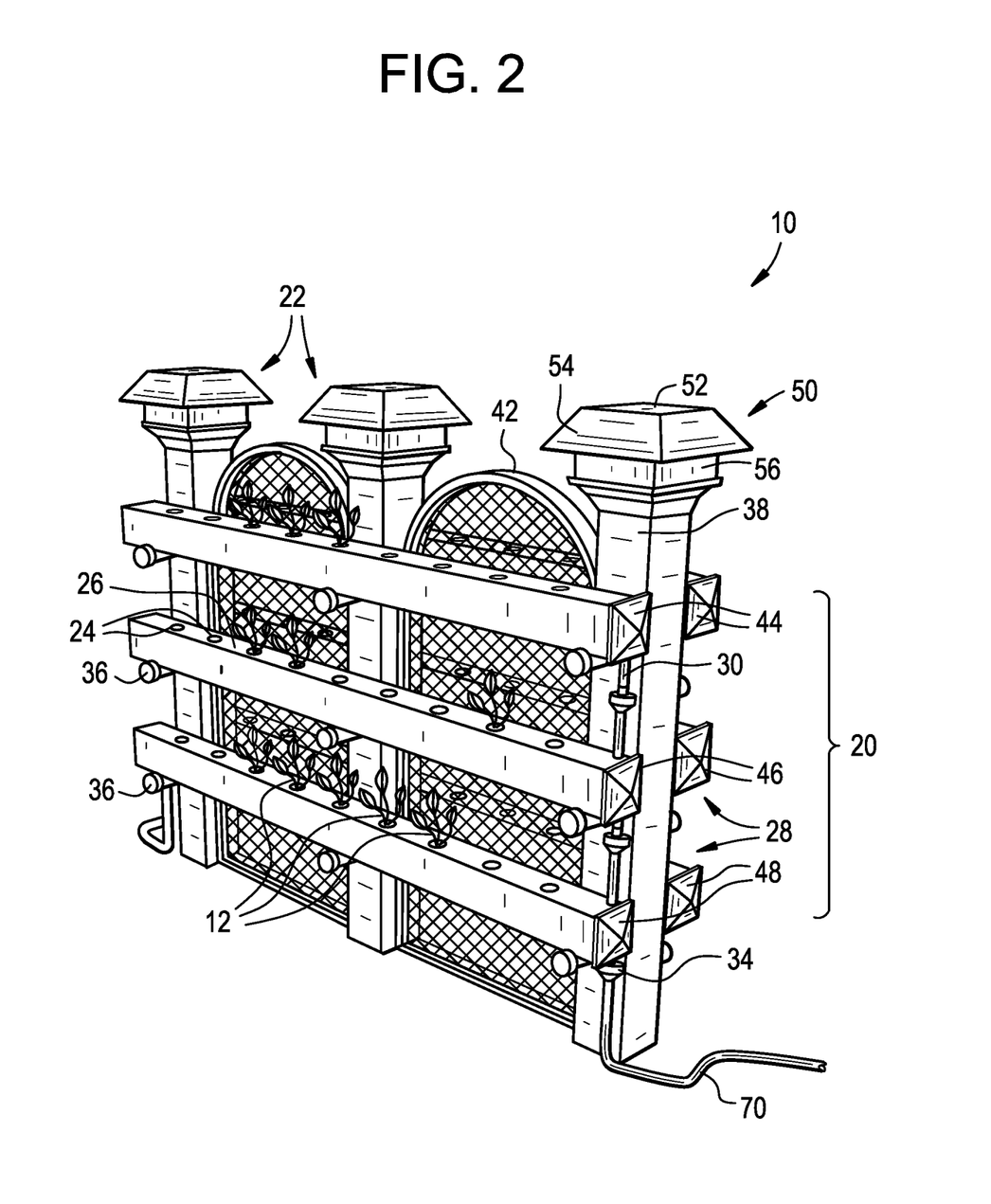
FIG. 2 depicts another isometric view of the integrated fence irrigation and grow system of FIG. 1.
Figure 3:
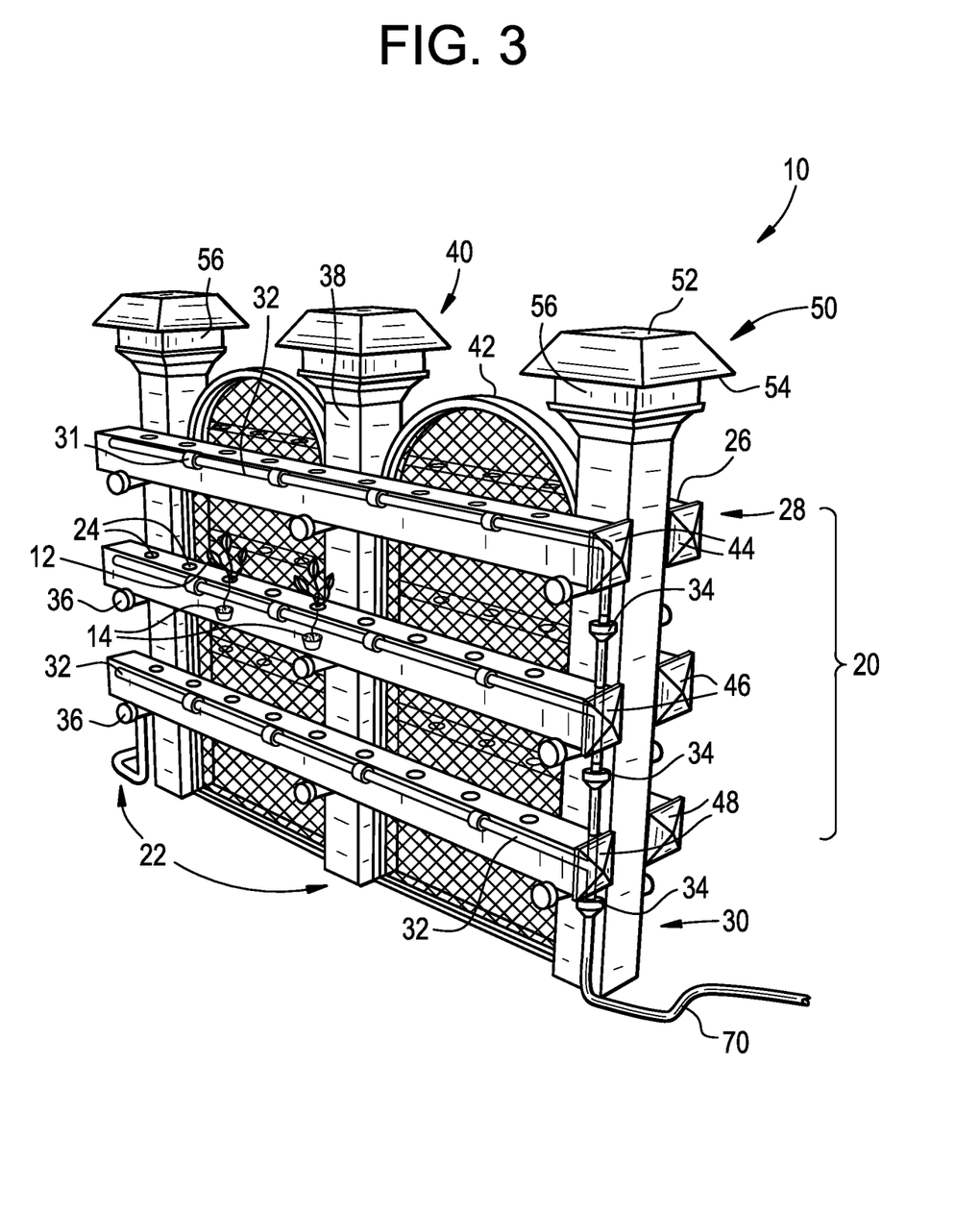
FIG. 3 depicts an isometric, partially transparent view of the integrated fence irrigation and grow system of FIG. 1, in accordance with one embodiment of the present invention.
Figure 4:
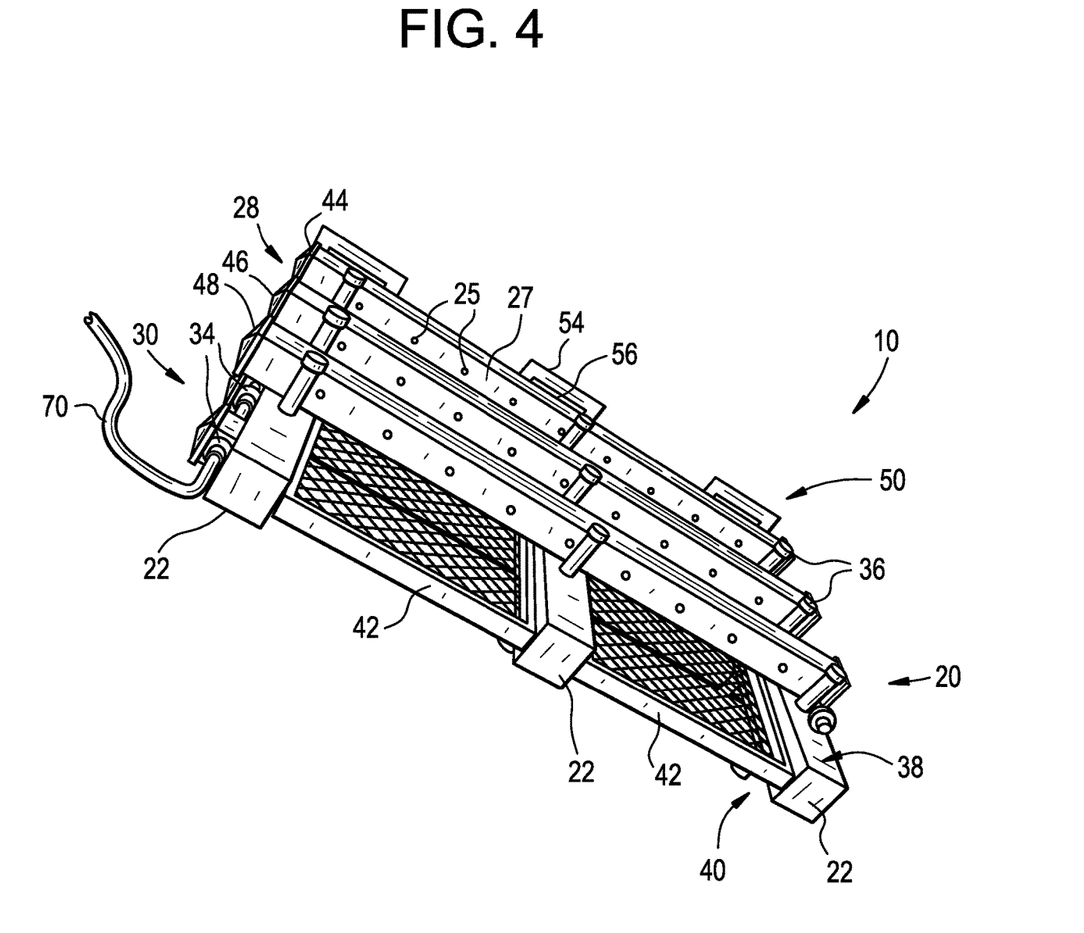
FIG. 4 depicts a bottom view of the integrated fence irrigation and grow system of FIG. 1.
Figure 5:
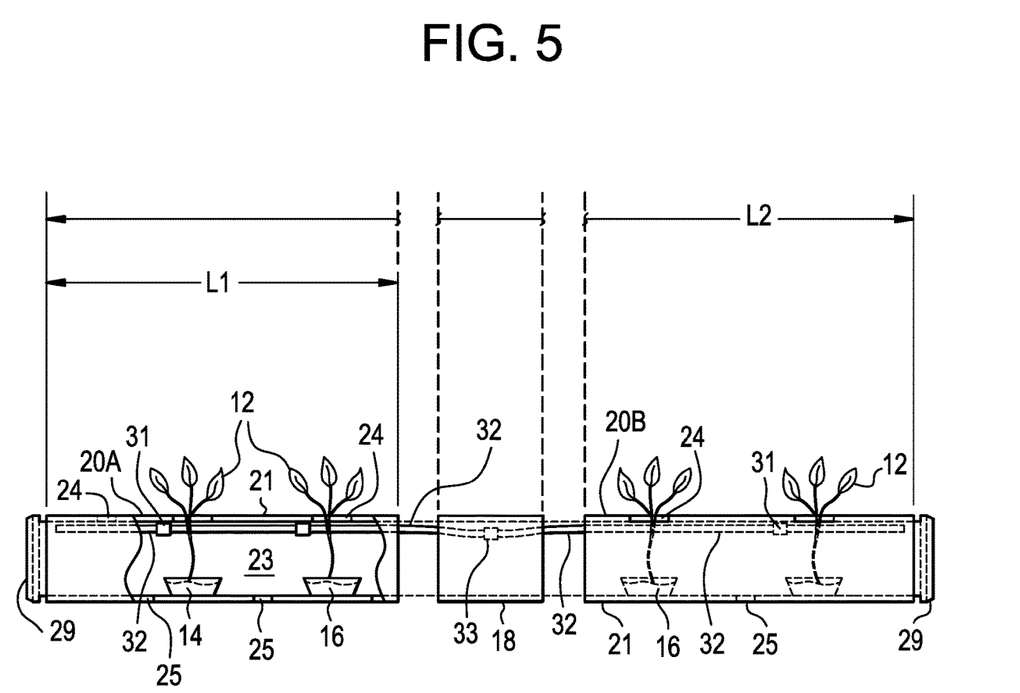
FIG. 5 depicts two bed members of the integrated fence irrigation and grow system of FIG. 1, operably coupled to extend their lengths, in accordance with one embodiment of the present invention.

In one embodiment, illustrated in FIG. 5, two or more bed members 20 may be selectively and operatively coupled to extend their horizontal lengths by use of a bed connector 18 that is disposed within interior cavities 23 and engages corresponding walls 21 of two bed members 20 in, for example, a slip or friction fit arrangement. For example, a length L1 of a first bed member 20A is extended to a length L2 (e.g., equal to the twice the length L1) by coupling to a second bed member 20B of the same or a different length, wherein the bed connector 18 engages the walls 21 and interior cavities 23 at corresponding ends of the first bed member 20A and the second bed member 20B. In one embodiment, the length L1 of a bed member 20 is at least one of about two feet (0.61 meters (m)), three feet (0.91 m), four feet (1.22 m), five feet (1.52 m), six feet (1.83 m), or eight feet (2.44 m). Accordingly, if both bed member 20A and 20B are four feet (1.22 m) in length, e.g., L1 equals four feet (1.22 m), then the combined length L2 is eight feet (2.44 m). It should be appreciated that the present invention is not limited to one or more of the aforementioned length dimensions, as it is within the scope of the present invention to configure the bed members 20 and or other members, for example, the post members 22, of various length, width and/or height dimensions to facilitate, for example, shipment, assembly, storage of the system 10 and the like.

As can be appreciated by those skilled in the art, by using a plurality of bed connectors 18 to operatively couple two or more bed members 20, the integrated fence irrigation and grow system 10 may be extended or assembled in an interconnected, interlocked, end-to-end fashion to form a uniform barrier or boundary along a property or area of interest. As can also be appreciated, corresponding lengths of the pipe 32 within each of the bed members 20 (e.g., the first member 20A and the second bed member 20B of FIG. 5) are operatively coupled by using a pipe connector 33 to extend the irrigation system 30 through the connected bed members 20. Accordingly, the irrigation system 30 is operatively coupled and extended throughout the integrated fence irrigation and grow system 10 by using a plurality of pipe connectors 33 in the aforementioned interconnected, interlocked, end-to-end fashion. It should be appreciated that it is within the scope of the present invention for one or both of the bed connectors 18 and pipe connectors 33 to be formed in various configurations to permit, for example, straight end-to-end, right angle end-to-end, or varying angle end-to-end interconnection or interlocking connection. While described above as being coupled with a slip or friction fit, it is within the scope of the present invention to use any other conventional fastening means, including mechanical fastening if a more secure engagement is desired. In one embodiment, one or both of the bed connectors 18 and pipe connectors 33 are comprised of flexible material to permit selective angular positioning of the end-to-end connection of bed members 20 and pipes 32. As also illustrated in FIG. 5, in one embodiment, the bed member 20 that are not interconnected, are terminated with use of a bed end-cap 29 that closes the interior cavity 23 thereof. It should be appreciated that a first portion of the bed end-cap 29 is disposed within the interior cavity 23 and engages the wall 21 of the bed member 20 in, for example, a slip or friction fit arrangement. A second portion of the base end-cap 29 traverses the end of the bed member 20 from the top surface 26 to the bottom surface 27, and the sides thereof, to provide for example, a decorative closure to the interior cavity 23 and the end of the bed member 20. In one embodiment, the bed end-cap 29 may be glued or otherwise fixedly secured or fastened to the wall 21 of the bed member 20.

Referring again to FIGS. 1 to 4, in one embodiment, the one or more bed members 20 are supportable in position occupying parallel vertical planes upon each of the one or more post members 22. Each of the one or more post members 22 is vertically securable upon or within a ground surface, and each of a plurality of support members 36 are disposed perpendicularly at intervals along a height of each of the one or more post members 22. In one embodiment, the one or more post members 22 are each supported on the ground surface by a base member. As can be appreciated, the base member is of sufficient width to maintain the post member 22 in the above-described vertical orientation with respect to the ground surface. The support members 36 may be aligned for supportive engagement with each of the one or more bed members 20 positioned thereupon.

In one embodiment, each of the post members 22 includes a first side 38 and a second side 40 opposite the first side 38, whereon the support members 36 are perpendicularly disposed upon opposing sides of each post member 22. Thus, a plurality of bed members 20 is supportable on each of the opposing sides of the post members 22. As shown in FIGS. 1 to 4, each of the bed members 20 is paired in parallel on either side 38, 40 of each post member 22 along vertically arranged transverse planes relative to each of the post members 22. As noted above, this configuration is one embodiment of the present invention and it is within the scope of the present invention to employ other configurations of bed members 20 and post members 22.

In an example embodiment herein illustrated, the post members 22 include three post members, spaced apart along a common sagittal plane. Between each of the post members 22 is a trellis member 42. The trellis member 42 provides an ornamental accent and barrier while also enabling supportive structure for climbing plants, when grown, whereby a decorative barrier is disposed separating each side of the integrated fence irrigation and grow system 10.

In the example embodiment herein disclosed, the bed members 20 include a pair of topmost bed members 44, a pair of middle bed members 46, and a pair of lowermost bed members 48. It is contemplated as part of this invention that the lowermost bed members 48 have a width and/or height greater than the width and/or height of the middle bed members 46, and that the middle bed members 46 have a width and/or height greater than the width and/or height of the topmost members 44, whereby the bed members 20 are stackable interposed together (e.g., within interior cavities 23) for convenient storage and transport, as desired. It should also be appreciated that the varying widths and/or heights of bed members 44, 46 and 48 may facilitate accessibility for harvesting plants 12 and/or permit greater growth area for differing plant families or species.

In one embodiment, each of the post members 22 further includes a capital member 50, disposed on a top thereof, capping or crowning the post member 22. Disposed anteriorly atop each of the capital members 50 is a solar panel 52. In one embodiment, each of the capital members 50 includes an eave 54. Disposed proximal to the eave 54 of each capital member 50 is a light source 56. Thus, sunlight incident each solar panel 52 charges a battery (not shown) whereby the integrated fence irrigation and grow system 10 is selectively illuminable in dark hours, as desired.

The present integrated fence irrigation and grow system 10, therefore, enables a vertically arranged series of the bed members 20, disposed on either side of the post members 22, and each of the post members 22 being separated by the trellis member 42 disposed therebetween. Each of the bed members 20 upholds flora, as desired, therein, whereby the irrigation system 30 is adjustable to selectively control infiltration along each of the bed members 20, as desired, appropriate for particular flora therein disposed.

The present integrated fence irrigation and grow system 10, therefore, enables an attractive barrier and increased arability in a particular location where use of such a system is desirable such as, for example, an urban yard, rooftop, suburban yard or garden, property line or boundary, or elsewhere.

PARTS LIST 10 integrated fence irrigation and grow system
12 plants or flora
14 growth medium, e.g., soil
16 plurality of plant containers
18 bed connector
20 one or more bed members
21 wall
22 one or more post members
23 interior cavity
24 plurality of openings
25 plurality of drainage holes
26 top surface
27 bottom surface
28 first end
29 bed end-cap
30 irrigation system
31 clip
32 pipe
33 pipe connector
34 plurality of valves
36 plurality of support members 38 first side
40 second side
42 trellis member
44 topmost bed members
46 middle bed members
48 lowermost bed members
50 capital member
52 solar panel
54 eave
56 light source
70 garden hose or conduit Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. An integrated fence irrigation and grow system, comprises:
   one or more post members;
   one or more bed members disposed on the one or more post members, each of the bed members includes a tubular body having a top surface and a bottom surface, the tubular body formed by a wall, the wall defining an interior cavity in the bed member and having a plurality of openings disposed along the top surface thereof;
   an irrigation system coupled to a water supply and connected to each of the one or more bed members to introduce water to each of the one or more bed members;
   a bed connector disposed within the interior cavities and engaging corresponding walls of two of the bed members to selectively and operatively coupled the two bed members and to extend the horizontal lengths thereof; and
   a pipe connector disposed within the interior cavities and engaging the irrigation system within each of the two bed members to extend the irrigation system over the horizontal lengths thereof;
   wherein when growing medium is disposed within the interior cavity of the one or more bed members, plants planted in the growth medium in proximity to the plurality of openings grow therein, and foliage thereof is at least one of viewable and harvestable above the plurality of openings.

2. The integrated fence irrigation and grow system of claim 1, further comprises:
   a plurality of support members perpendicularly disposed on the one or more post members, each of the plurality of support members providing supportive engagement upholding the one or more bed members positioned thereon.

3. The integrated fence irrigation and grow system of claim 1, further comprises:
   a plurality of plant containers disposed within the interior cavity of the one or more bed members proximal to a corresponding one of the plurality of openings in the top surface of the bed members, each of the plurality of plant containers retaining the growth medium and the plants therein.

4. The integrated fence irrigation and grow system of claim 1, wherein the irrigation system further includes a pipe disposed in the interior cavity of each of the one or more bed members above the growth medium, and wherein the pipe includes a plurality of perforations disposed serried along each pipe to provide drip irrigation to the growth medium.

5. The integrated fence irrigation and grow system of claim 1, wherein the irrigation system further includes a plurality of valves disposed associated with each of the one or more bed members, each of the plurality of valves providing an individually and selectively controllable rate of water flow to each of the one or more bed members.

6. The integrated fence irrigation and grow system of claim 1, wherein the one or more bed members further include a plurality of drainage holes disposed through the wall along the bottom surface of each of the one or more bed members to allow passage of excess water out of the interior cavity.

7. The integrated fence irrigation and grow system of claim 1, further comprises:
   a trellis member is disposed between a pair of the post members, the trellis member providing an ornamental boundary between the pair of the post members and a support medium for climbing plants grown in the integrated fence irrigation and grow system.

8. The integrated fence irrigation and grow system of claim 1, further comprises:
   a capital member disposed on a top of each of the one or more post members, the capital member includes a top portion and an eave portion.

9. The integrated fence irrigation and grow system of claim 8, further comprises:
   a solar panel disposed on the top portion of the capital member, the solar panel captures solar insolation incident on the solar panel and generates a potential difference that is storable as electrical energy; and
   a light source disposed on the capital member proximal to the eave portion, the light source operatively coupled to the solar panel receiving the stored electrical energy to power the light source for selective illumination during dark hours.

10. The integrated fence irrigation and grow system of claim 1, further comprises:
    a bed end-cap having a first portion and a second portion, the first portion of the bed end-cap engages the wall of and is disposed within a portion of the interior cavity of at least one of the one or more bed members, and the second portion of the bed end-cap terminates the interior cavity of the one or more bed members.

11. The integrated fence irrigation and grow system of claim 1, wherein a plurality of the bed connectors operatively couple a plurality of the bed members disposed on a plurality of the post members, and a plurality of the pipe connectors operatively couple the irrigation system through the plurality of the bed members such that the integrated fence irrigation and grow system provides a structural medium for above-ground growth of plants with controllable irrigation to enable at least one of a decorative accent, boundary, and fence that is selectively positional along an area of interest.

12. An integrated fence irrigation and grow system, comprises:
    a plurality of post members, each having a first side and an opposing second side and is disposed vertically securable into a ground surface;

a plurality of capital members, each disposed on a top of each of the plurality of post members, each of the capital members includes a top portion and an eave portion;

a plurality of bed members disposed in horizontal parallel relation along the first side and the second side of each of the plurality of post members, wherein the plurality of bed members include a pair of topmost bed members, a pair of middle bed members and a pair of lowermost bed members disposed on each of the first side and the second side of each of the plurality of post members in a paired relation, each of the bed members includes a tubular body having a top surface and a bottom surface, the tubular body formed by a wall, the wall defining an interior cavity in the bed member and having a plurality of openings disposed along the top surface thereof;

a plurality of support member perpendicularly disposed on each of the first side and the second side of each of the plurality of post members, each of the plurality of support members providing supportive engagement upholding one of the plurality of bed members positioned thereon;

a trellis member is disposed between a pair of the plurality of post members, the trellis member providing an ornamental boundary between the first side and the second side of the pair of the post members and a support medium for climbing plants grown in the plurality of bed members;

an irrigation system having a plurality of pipes and a plurality of valves, the plurality of pipes include a pipe disposed in the interior cavity of each of the plurality of bed members, the plurality of valves include a valve associated with each of the plurality of bed members, the irrigation system is coupled to a water supply and through the plurality of pipes and the plurality of valves introduces water to each of the plurality of bed members at a selectively controllable rate of water flow;

a plurality of bed connectors, each disposable within the interior cavities and engaging corresponding walls of two of the plurality of bed members to selectively and operatively coupled the two bed members and to extend the horizontal lengths thereof; and a plurality of pipe connectors, each disposable within the interior cavities and engaging the irrigation system within each of the two bed members to extend the irrigation system over the horizontal lengths thereof;

wherein when growing medium is disposed within the interior cavity of each of the plurality of bed members, plants planted in the growth medium in proximity to the plurality of openings grow therein, and foliage thereof is at least one of viewable and harvestable above the plurality of openings.

13. The integrated fence irrigation and grow system of claim 12, wherein the plurality of pipes disposed in the interior cavity of each of the plurality of bed members each include a plurality of perforations disposed serried along each pipe to provide drip irrigation to the growth medium in the interior cavity.

14. The integrated fence irrigation and grow system of claim 12, wherein the plurality of bed members each further include a plurality of drainage holes disposed through the wall along the bottom surface of each of the plurality of bed members to allow passage of excess water out of the interior cavity.

15. The integrated fence irrigation and grow system of claim 12, further comprises:

a solar panel disposed on the top portion of each of the plurality of capital members, the solar panel captures solar insolation incident on the solar panel and generates a potential difference that is storable as electrical energy; and a light source disposed on each of the plurality of capital members proximal to the eave portion, the light source operatively coupled to the solar panel receiving the stored electrical energy to power the light source for selective illumination during dark hours.

16. The integrated fence irrigation and grow system of claim 12, further comprises:

a plurality of bed end-caps each having a first portion and a second portion, the first portion of the each of the plurality of bed end-caps engages the wall of and is disposed within a portion of the interior cavity of at least one of the plurality of bed members, and the second portion of the bed end-cap terminates the interior cavity of the at least one of the plurality of bed members.

17. The integrated fence irrigation and grow system of claim 12, wherein the plurality of bed connectors operatively couple the plurality of bed members disposed on the plurality of post members, and the plurality of the pipe connectors operatively couple the irrigation system through the plurality of bed members such that the integrated fence irrigation and grow system provides a structural medium for above-ground growth of plants with controllable irrigation to enable at least one of a decorative accent, boundary, and fence that is selectively positional along an area of interest.

* * * * *